United States Patent [19]
Sicilia

[11] Patent Number: 5,972,258
[45] Date of Patent: Oct. 26, 1999

[54] METHOD OF USING A MULTIPLE GATING NOZZLE

[75] Inventor: Roberto Domenic Sicilia, Mississauga, Canada

[73] Assignee: Husky Injection Molding Systems Ltd., Bolton, Canada

[21] Appl. No.: 08/954,728

[22] Filed: Oct. 20, 1997

[51] Int. Cl.⁶ .......................... B29C 45/16; B29C 45/20
[52] U.S. Cl. ........................... 264/45.1; 264/328.8
[58] Field of Search ................ 264/328.8, 45.1; 425/564, 566

[56] References Cited

U.S. PATENT DOCUMENTS

| | | | |
|---|---|---|---|
| 3,873,656 | 3/1975 | Garner | 264/55 |
| 3,966,372 | 6/1976 | Yasuike et al. | 425/564 |
| 4,201,209 | 5/1980 | Leveen et al. | 264/328.8 |
| 4,213,751 | 7/1980 | Fernandez | 425/566 |
| 4,222,733 | 9/1980 | Gellert et al. | 425/566 |
| 4,289,191 | 9/1981 | Myllymaki | 425/573 |
| 4,381,275 | 4/1983 | Sorensen | 264/328.8 |
| 4,470,936 | 9/1984 | Potter | 264/45.1 |
| 4,702,686 | 10/1987 | Gauler | 425/190 |
| 4,717,324 | 1/1988 | Schad et al. | 264/328.8 |
| 4,783,298 | 11/1988 | Oda | 425/566 |
| 4,925,384 | 5/1990 | Manner | 425/566 |
| 4,957,682 | 9/1990 | Kobayashi et al. | 264/328.8 |
| 5,028,226 | 7/1991 | De'ath et al. | 425/564 |
| 5,030,077 | 7/1991 | Orimoto et al. | 425/564 |
| 5,125,816 | 6/1992 | Morita | 425/129.1 |
| 5,143,733 | 9/1992 | Von Buren et al. | 425/564 |
| 5,238,378 | 8/1993 | Gellert | 425/566 |
| 5,286,184 | 2/1994 | Nakayama | 425/566 |
| 5,288,225 | 2/1994 | Schmidt et al. | 425/566 |
| 5,356,576 | 10/1994 | Fischbach | 264/328.8 |
| 5,423,672 | 6/1995 | Gordon | 425/564 |
| 5,533,882 | 7/1996 | Gessner et al. | 264/328.9 |
| 5,582,851 | 12/1996 | Hofstetter et al. | 425/564 |
| 5,645,874 | 7/1997 | Osuna-Diaz | 425/549 |
| 5,651,998 | 7/1997 | Bertschi et al. | 425/127 |
| 5,667,819 | 9/1997 | Eckardt | 425/566 |

FOREIGN PATENT DOCUMENTS

| | | | |
|---|---|---|---|
| 32 49 486 | 6/1984 | Germany | 425/564 |
| 4-334422 | 11/1992 | Japan | 425/564 |

*Primary Examiner*—Allan R. Kuhns
*Attorney, Agent, or Firm*—Fitzpatrick, Cella, Harper & Scinto

[57] ABSTRACT

A method and apparatus for runnerless injection molding of plastic materials utilizing a novel valve stem for controlling the opening and closing of at least two gates in a single injection nozzle. The method and apparatus includes at least two separate melt streams whose flows are not obstructed by the valve stem. These melt streams may contain the same plastic material or different plastic materials and the injection nozzle may be either simultaneously or sequentially activated for filling the mold cavity.

16 Claims, 5 Drawing Sheets

METHOD OF USING A MULTIPLE GATING NOZZLE

FIELD OF THE INVENTION

The present invention relates to a method and apparatus for runnerless injection molding provided with a novel valve gate for permitting at least two gates to be controlled in a single nozzle. In particular, the invention relates to an improved method and apparatus for molding hollow articles and preforms for blow molding which have a layered wall structure.

BACKGROUND OF THE INVENTION

This invention concerns injection molding nozzles used to inject plastic material into the cavity of a mold. Such nozzles receive molten plastic material from an injection molding machine and direct the same into a mold cavity through a passage called a gate. Two methods exist for this transfer: thermal, or open, gating; and valve gating.

In thermal gating, the gate is an open aperture through which plastic can pass during injection of plastic material. The gate is rapidly cooled at the end of the injection cycle to "freeze" the plastic material which remains in the gate to act as a plug to prevent drool of plastic material into the mold cavity when the mold is open for ejection of parts. In the next injection cycle, the cooling to the gate is removed and hot plastic material pushes the plug into the mold cavity, where it melts and mixes with the new melt stream.

In valve gating, gate opening and closing is independent of injection pressure and/or cooling, and is achieved mechanically, with a pin that travels back and forth, to open and close the gate.

Generally, valve gating is preferable to thermal gating because the gate mark left by valve gating on the finished molded part after injection is complete is much smaller than that which results from thermal gating. Larger gate sizes can also be used in valve gate systems, leading to faster filling of the mold cavities and therefore shorter molding cycle times.

However, some disadvantages are frequently associated with valve gates. These disadvantages include "weld lines", which are areas where multiple melt flow fronts meet, and valve stem wear. Weld lines tend to introduce weakness or loss of mechanical strength into the finished part and result from the fact that the valve stem is surrounded by the plastic material, splitting the melt stream, which is later rejoined at the end of the stem, and this re-combining of the stream leads to weld lines. Hence, there exists a need for a gate design which allows for the melt star, or streams in the case of two or more plastic materials, to remain separate while still being controlled with a common valve stem.

The valve stem is also subject to wear from mechanical stress, due to stem deflection from the incoming pressurized melt, and thermal stress, from constant contact with the melt. This wear is exacerbated in cases where reinforced plastic materials, i.e., those containing glass or other fibers or materials, are injected Hence, there exists a need for a gate design which mitigates the wear of the valve stem.

The injection of two or more separate melt streams into a mold cavity, whether simultaneously or sequentially, is referred to as co-injection, and leads to layered wall structures in hollow articles and blow molding preforms. The prior art includes a multitude of processes and apparatuses for forming molded articles from multiple plastic materials by co-injection. For example, U.S. Pat. Nos. 5,028,226 and 4,717,324 show simultaneous and sequential co-injection apparatuses and methods, respectively. Both patents show one nozzle dedicated to each mold cavity wherein the cavity is filled by injecting two or more resins through a single gate.

In the systems shown in each patent, a valve stem is used to prevent resin flow through the gate after injection is complete. In these systems, the hot runner systems employed to receive the various resins from their source for conveyance to the mold cavities are very complicated. Consequently, such hot runner systems lead to mold designs which are not compact and thereby allow fewer cavities and fewer articles to be molded within a given space on a molding machine.

U.K. Patent No. 1,369,744 discloses a sequential co-injection system using separate channels, commonly referred to as sprue channels, for each melt stream,, and sliding shuttles which function as valve stems to open and close the connection between the injection machine and the channels. However, these separate melt channels converge into a single common gate area prior to injection, so that some potential for contamination between streams exists. Furthermore, the shuttles are hydraulically actuated, increasing the complexity of the nozzle and allowing the risk of leaking hydraulic fluid to contaminate the streams.

U.S. Pat. No. 4,470,936 also discloses a sequential co-injection system using separate sprue channels for each melt stream, with each sprue channel being independently heated and converging to a common gate. In this system, a shuttle ball or swing gate switches the flow of material from one sprue channel to the other. This system also suffers from the potential for contamination between streams, such as described above for U.K. Patent 1,369,744. This is a special concern as wear of the shuttle bail or swing gate is likely in normal use.

U.S. Pat. No. 5,651,998, assigned to the assignee of the present invention, discloses a method and apparatus for either sequential or simultaneous co-injection utilizing two opposing injection nozzles on the core and cavity sides respectively of the mold. Although effective, this arrangement requires an additional injection nozzle which must also receive resin from an injection unit on the opposite (movable) mold core half. This arrangement significantly increases the space requirements for the mold and may not be acceptable in some applications.

U.S. Pat. No. 5,125,816 is similar to U.S. Pat. No. 5,651,998 in that sequential co-injection is achieved by opposing gates on both the mold core and cavity respectively. However, in this arrangement the moveable mold half is fitted with slide cores containing tubular passages for feeding resin to one half of the molded part These slide cores move via hydraulic cylinders to define secondary mold cavities, which are in turn filled by gates on the opposing mold half. This system suffers from disadvantages due to its complexity, the additional mold hardware requirements, including the aforementioned slide cores and additional injection nozzles, and the need for special manufacturing attention due to tight tolerances.

U.S. Pat. No. 3,873,656 shows a co-injection apparatus wherein at least two plastics are injected into a mold cavity through different gates, using a valve gating system. This design is only suitable for molding very large plastic articles. Also, the hot runner system taught does not have the capability for allowing separate temperature control of the different resin types, which inherently limits the variety of resins that can be used together in one system. Furthermore, since the gates are far apart from one another, the flow of each resin will not be symmetrical throughout the part but instead will be biased in the area of the gate.

U.S. Pat. No. 4,289,191 shows injection molding of molten wax into a precision metal die, wherein hollow parts are molded to extremely tight tolerances of ±0.012 mm. The wax stream flows from a nozzle having a central bore to a cavity or space formed between the nozzle tip, which has a relief channel, and the socket on the exterior of the die, and then into two or more separate sprue ports that feed into the mold cavity. Control of wax flow is accomplished by a retractable plunger in the nozzle which functions like a conventional valve stem. Although more than one sprue port is employed to supply material to the mold, these ports are downtown the valve in the nozzle. Also, the valve stem obstructs the melt flow by being in the center of the melt stream, leading to weld lines. Finally, no provision is made for two or more separate resins to be injected through the two or more sprue ports, so this method cannot be used for co-injection purposes.

U.S. Pat. No. 5,645,874 shows a multiple gate nozzle in which each nozzle associated with a respective gate is equipped with an individual heater to allow independent thermal gating. In this arrangement, a central flow passage feeds a plurality of radially extending branch passages leading to each respective gate, and as such, cannot accommodate multiple sources of resin or even sequential melt flow, and therefore cannot be used for co-injection purposes.

U.S. Pat. No. 4,702,686 shows a nozzle wherein a tapered plate divides a central flow channel into two partial channels prior to the nozzle tip and gate. This nozzle cannot accommodate the separate, different, resin sources require for coinjection purposes.

SUMMARY OF THE INVENTION

It is an object of the present invention to provide an novel apparatus and method for injecting at least two plastic materials into a mold cavity which obviates or mitigates at least one of the disadvantages of the prior art.

According to a first aspect of the present invention, there is provided a method of co-injecting at least two different plastic materials to form a multi-layer molded product using a hot runner injection molding machine with a separate channel for each material, each channel having an end in communication with a separate gate for feeding an injection mold, the method comprising:

(i) heating the plastic materials in their separate channels or storage areas;

(ii) injecting a selected amount of a first plastic material from a first channel through a first gate into the injection mold and preventing firer flow of material from the first channel;

(iii) injecting a selected amount of a second plastic material from a second channel through a second gate into the injection mold, said second gate being separated from said first gate by a gate separating means;

(iv) injecting a selected amount of a third material, said third material being selected from one of said first plastic material and any other plastic material, said third material being injected from its respective channel via its respective gate, said respective gate being separated from said second gate by a gate separating means; and (v) moving a valve stem forward to close each said gate.

According to another aspect of the present invention, there is provided a method of co-injecting at least two different plastic materials to form an article having abutting portions of said different plastic materials using a hot runner injection molding machine with a separate channel for each different plastic material, each channel having an end in communication with a respective separate gate for feeding an injection mold, comprising the steps of:

(i) heating each different plastic material in its respective separate channel;

(ii) injecting a metered amount of a first plastic material from a first channel through a first gate into the injection mold and simultaneously injecting a metered amount of a second plastic material from a second channel through a second gate into the injection mold, said second gate being separated from said first gate by a gate separating means;

(iii) injecting a metered amount of a plastic material into the injection mold from its respective individual channel through its respective gate; and (iv) moving a valve stem to block all gates leading into the injection mold.

According to another aspect of the present invention, there is provided a method of co-injecting at least two different plastic materials to form a multi-layer molded product employing a hot runner injection molding machine with a separate channel for each material, each channel having an exit in communication with a respective separate gate for feeding an injection mold, the method comprising the steps of:

(i) heating the plastic materials in their separate channels;

(ii) injecting a selected amount of a first plastic material from a first channel through a first gate into the injection mold and inhibiting further flow of material from said;

(iii) injecting a selected amount of a second material from a second channel through a second gate into the injection mold, said second gate being separated from said first gate by a gate separating means comprising a protrusion that engages a valve stem to support said valve stem;

(iv) injecting a selected amount of a third material, said third material comprising at least one of said first material and another material, said third material being injected from its respective channel and its respective gate into said injection mold; and (v) moving said valve stem to close at least one of said gates, each gate which is not closed by said valve stem being gated by thermal shut-off to inhibit the flow of plastic into the mold.

According to yet another aspect of the present invention, there is provided a hot runner injection molding apparatus for co-injecting at least two plastic materials into a forming mold, comprising:

a separate channel for each of said at least two plastic materials;

a separate heating means for each of said separate channels;

a separate gate for each of said at least two plastic materials, each said gate being in communication with a corresponding one of said separate channels;

a valve stem movable between a first position wherein each said separate gate is open and a second position wherein each said separate gate is closed; and a gate separating means comprising a protrusion separating each said separate gate from each other said separate gate, said protrusion co-operating with said valve stem to inhibit deflection thereof.

According to yet another aspect of the present invention, there is provided a hot runner injection molding apparatus for co-injecting at least two different plastic materials through separate channels to form a multi-layer molded product, each separate channel being independently heated and having an end in communication with a respective separate gate entrance into a forming mold, a gate separating means to prevent intermixing of the different plastic materials prior to exit at the gates, and a valve stem capable of longitudinal movement to permit and inhibit the flow of the different plastic materials through said gates, said gate separating means engaging a portion of said valve stem to inhibit lateral deflection thereof The present invention provides a nozzle for plastic injection molding machines whereby flow disturbances and the resulting weld lines, which normally occur with known valve gate systems, are reduced Further, the present invention provides an injection system and method that employs relatively simple nozzle and hot runner designs. The present invention also provides a space-efficient, multi-material injection system for efficiently molding a plurality of articles in a multi-cavity mold. The present invention also provides an injection system and method wherein gates of different sizes can be accommodated in a single injection nozzle, each gate size being selected according to the viscosity of the particular plastic material flowing through it.

The present invention provides a novel method for runnerless injection molding, provided with a valve gate assembly, including at least two melt streams separated at the edge of the mold cavity by a gate separating means, a valve stem that is reciprocally movable and at least two gates that are opened and closed by the valve stem.

BRIEF DESCRIPTION OF THE DRAWINGS

The present invention will now be described, by way of example only, with reference to the attached Figures, wherein:

FIG. 4b is a section of the nozzle assembly of FIG. 4a, taken along line A—A of FIG. 4a;

FIG. 4c is a section of the nozzle assembly of FIG. 4a, taken along line B—B of FIG. 4a;

FIG. 5a is a side view of a valve stem for the nozzle assembly of FIG. 4a; and

FIG. 5b is an end view of the valve stem of FIG. 5a.

DESCRIPTION OF THE PREFERRED EMBODIMENTS

Figure 1:
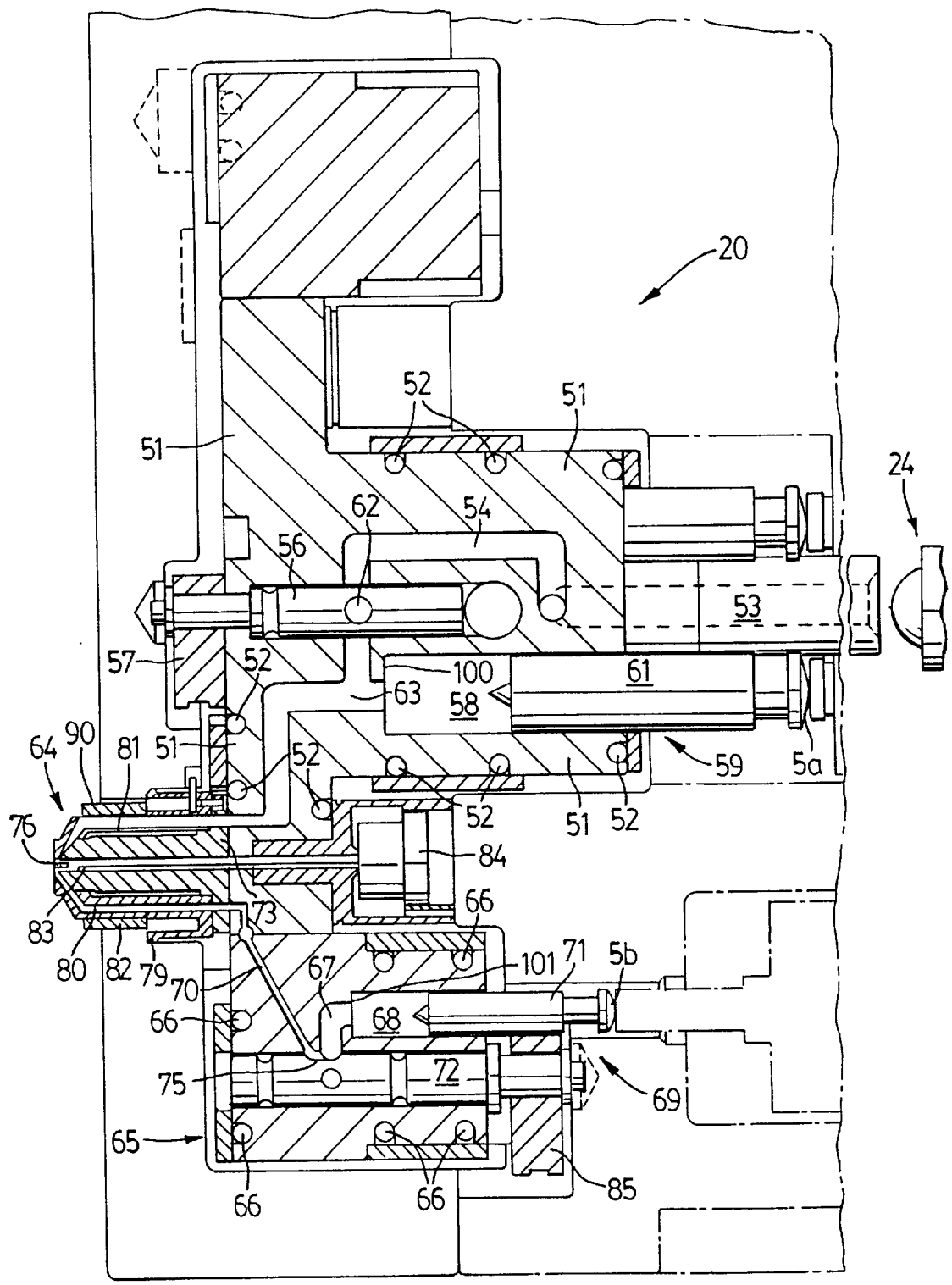
FIG. 1 is a sectional view of a hot runner-nozzle assembly for a mold cavity wherein two separate plastic materials fed to the nozzle tip and controlled by a single valve stem.

In FIG. 1 an embodiment of a valve gate assembly and injection nozzle in accordance with the present invention is indicated generally at 20 which is, in this embodiment of the present invention, a co-injection hot runner system which accommodates two plastic materials. One plastic material is provided from a source comprising extruder 24 and the other plastic material is provided from a separate extruder (not shown). As used herein, different plastic materials are not intended to be limited to different material compositions, such as PET versus EVOH, but can also comprise, without limitation, materials with generally the same composition but different characteristics, such as PET in different colours or virgin PET versus recycled PET, foamed plastic materials versus non-foamed plastics, etc.

In this example, the portion of the hot runner system connected to extruder 24 is maintained at a temperature ranging from 500° to 550° F., the optimum processing temperature for a thermoplastic resin such as polyethylene teraphthalate, or PET, by suitable heaters in well-known fashion. Conversely, the portion of the system, illustrated in broken lines, which is connected to the second extruder is maintained at a different temperature, such as the range from 400° to 440° F., the optimum processing temperate for a thermoplastic resin such as EVOH. It is to be noted that the plastic materials selected and their optimum processing temperatures are merely examples of the present invention and their use in the present description is not intended as a limitation of the present invention.

A central manifold block 51 maintained at an operating temperature ranging from 500 to 550° F. by heating elements 52 and receives plasticized resin from extruder 24 through channels 53 and 54. A spool, or rotary, valve 56 is in circuit with channel 54 and operated by link mechanism 57, and controls the charging of reservoir 58 of the shooting pot, or injection cylinder, 59 equipped with an injection piston or charging piston 61. Valve 56 is formed with a transverse throughbore 62 and is shown in the closed position in FIG. 1.

Figure 2:
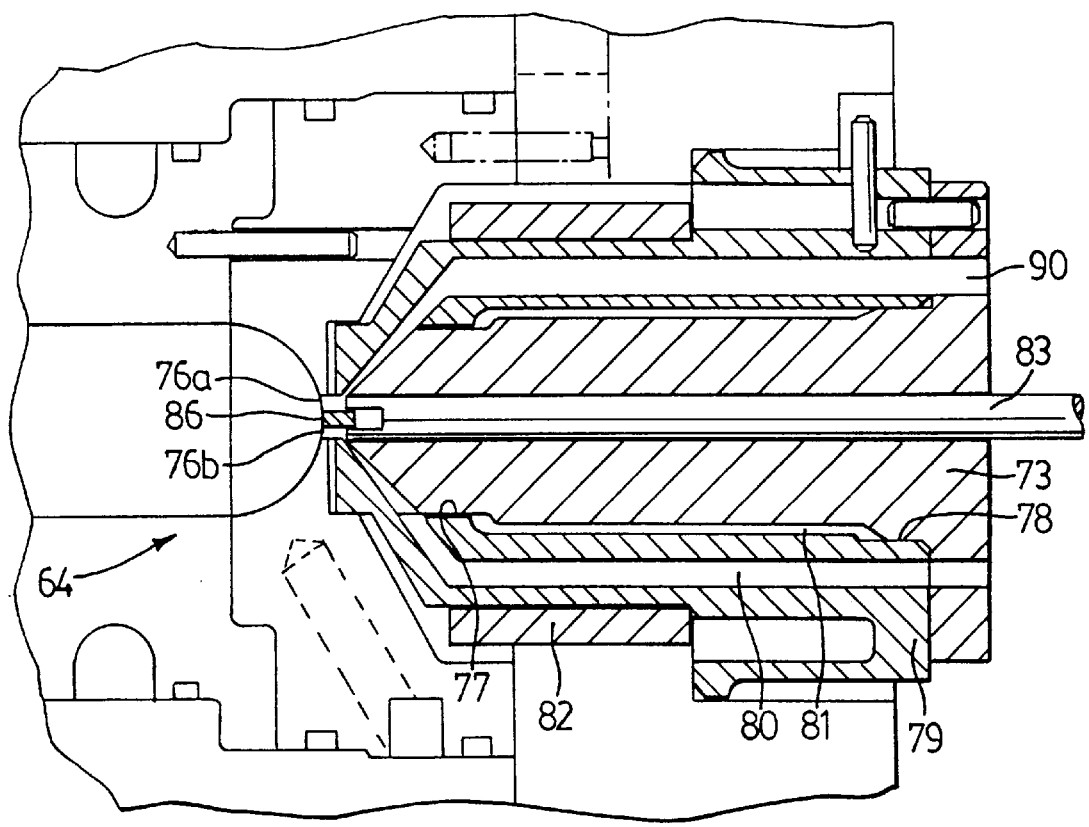
FIG. 2 is an expanded view of the nozzle assembly of FIG. 1.

With reference now to FIGS. 1 and 2, reservoir 58 communicates with a nozzle assembly 64 via channel 63. Heating elements 52 maintain the desired processing temperature of channel 63 as the PET or other plastic material progresses through to channel 90 of nozzle assembly 64 to a gate 76a. As shown, gate 76a is separated from an adjacent gate 76b by a gate separating means. In a preferred aspect of the present invention, the gate separating means is in the form of a protrusion 86 that partially overlaps central valve stem 83, which is shown in the retracted position ill these Figures.

This partial overlap of valve stem 83 and protrusion 86 inhibits any lateral alignment problems that might ordinarily occur where the stem moves longitudinally backwards and forwards over millions of injection cycles under very high injection pressures exceeding twenty thousand psi. While the overlap between protrusion 86 and stem 83 is preferred, it is not essential to the invention and, as will be understood by those of skill in teat the gate separating means need not be a protrusion and can instead be any suitable barrier between the gates 76.

As best seen in FIG. 1, a manifold segment 65 is secured to manifold block 51 and is heated by elements 66 to maintain optimum temperature (400° to 440° F.) in the hot runner connecting the second extruder (not shown) to channel 67 and to a reservoir 68 of a second shooting pot 69 which is equipped with an injection or charging piston 71. Here again, a spool or rotary valve 72 (shown in the closed position relative to channel 67 in FIG. 1) controls charging of reservoir 68. In the closed position of the spool valve 72, reservoir 68 communicates with nozzle assembly 64 via a channel 70 through a cut-out 75. When the spool valve 72 is open, channel 70 is closed and a link mechanism 85 operates to rotate valve 72.

As shown in FIG. 2, nozzle assembly 64 includes a central spigot 73 in thermal contact with manifold block 51 immediately adjacent local heating elements 52 and spigot 73 is preferably fabricated from a good metallic thermal conductor such as beryllium copper. Spigot 73 is supported by minimal bearing surfaces 77,78, best seen in FIG. 2, in a housing 79 and is spaced from spigot 73 along substantially its entire length to form an insulating air gap 81. Air gap 81 inhibits conduction of heat from the spigot 73 to the housing 79 to maintain the desired process temperature, controlled by heating means 82, as the plastic material, such as EVOH, progresses through channel 80 of housing 79 to gate 76b.

The size of each of gates 76a and 76b can be selected as desired, largely independent of the other of gates 76a and 76b, which is advantageous in situations where the viscosities of the different resin streams are significantly different or wherein a significantly larger amount of one material than the other is to be injected in an injection cycle.

Thus, it is apparent that the nozzle and valve gate and the hot runner system of the present invention is effective to maintain different optimum process temperatures appropriate to two different plastic materials from the source of the plastic materials to the nozzle gates.

As will be apparent to those of skill in the art, because the plastic material is supplied to gates 76a and 76b via channels 80 and 90, respectively, the plastic materials do not contact the majority of stem 83 and thus wear of stem 83 is reduced in comparison to conventional designs.

A preferred method of operation will now be described with reference to the PET and EVOH example described above. To prime the hot runner system initially, extruder 24 and the second extruder, including their respective co-operating shooting pots 59 and 69 are purged and the extruders are moved into operative position relative to their respective manifolds. With valve stem 83 and spool valves 56 and 72 in the open position, shooting pot reservoirs 58 and 68 are charged with PET and EVOH material, respectively. Next, valve stem 83 is closed by a piston 84 and purged resin in the mold cavity is removed.

Figure 3:
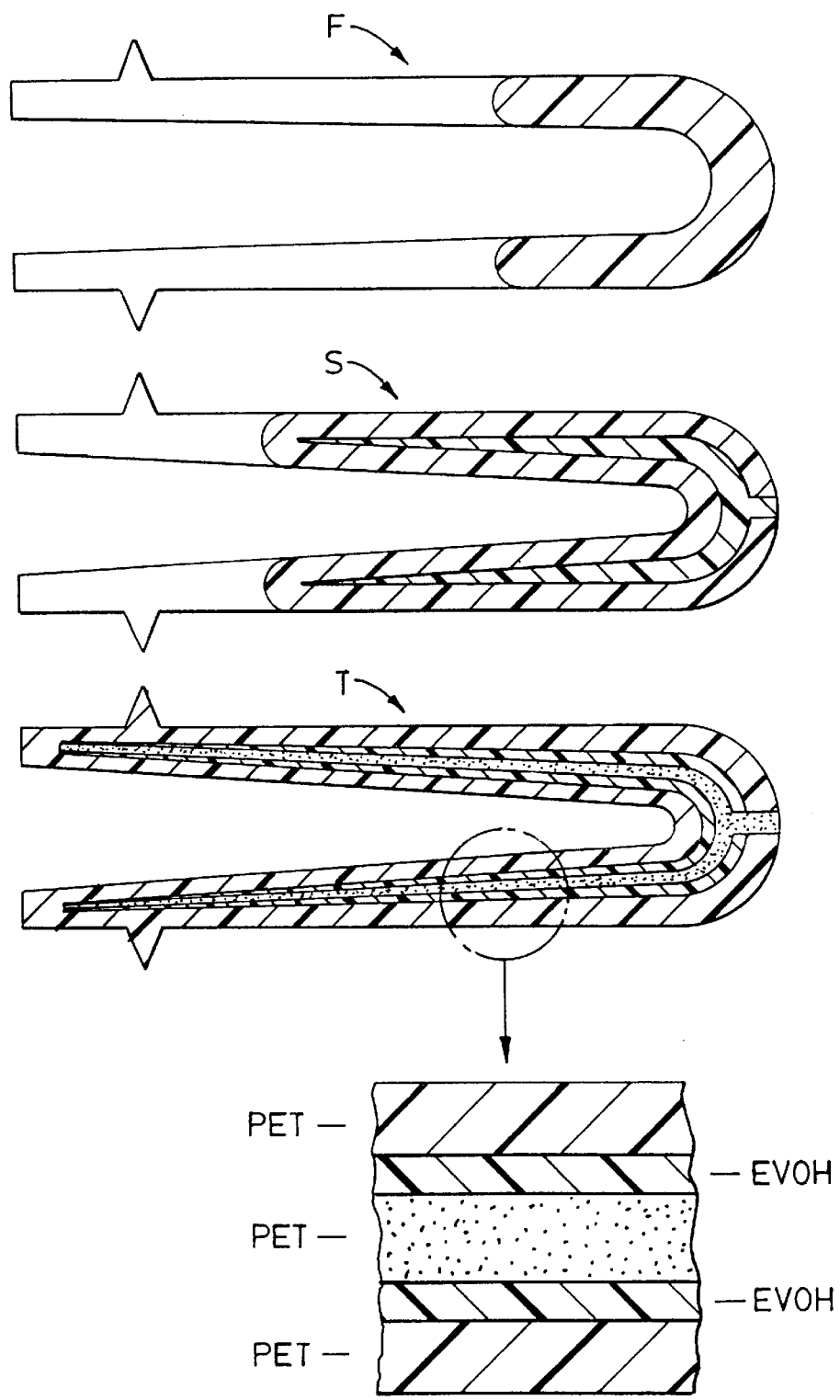
FIG. 3 is a set of sectional views of a molded article detailing the layered wall structure after first, second, and third shots of plastic material.

Thereafter the mold is closed and clamped, valve stem 83 is opened and the following sequence is performed. First, spool valve 56 is closed and injection piston 61 is advanced until it bottoms at the point indicated by the reference numeral 100, discharging a measured amount of PET into the mold cavity through channel 63 and gate 76a, which is separated from the adjacent gate 76b by a protrusion 86. This constitutes the first shot of PET into the mold cavity, as shown schematically at F in FIG. 3.

Piston 61 is held forward (in its bottomed position 100) blocking access to reservoir 58 to prevent backflow of PET compound from channel 63 into reservoir 58. That is, the piston 61 is held bottomed to block access to reservoir 58 because upon subsequent operation of piston 71 to inject EVOH, the EVOH injection pressure would have a tendency to displace PET from channel 63 back into reservoir 58.

Next, spool valve 72 is closed to the second extruder and opened to channel 70. Injection piston 71 is moved until it bottoms at 101 and thus discharges a measured amount of EVOH into the cavity through channel 70 and gate 76b. This constitutes the first shot of EVOH into the mold cavity (second shot of resin) to develop the three-layer wall as shown schematically at S in FIG. 3. As will be apparent, the volume of the first and second shots of resin is less than the total volume of the mold cavity.

Next channel 70 is closed by appropriate rotation of spool valve 72 and spool valve 56 is opened, allowing extruder 24 to complete the filling of the mold cavity with PET and to pack the molded part while piston 61 remains bottomed, blocking access to reservoir 58. This step constitutes the second shot of PET (third shot of resin) to develop a five-layer wall, as shown schematically at T in FIG. 3. Thus, a five-layer wall structure is molded using two resins.

After packing is completed, valve stem 83 is moved forward to the closed position, where it blocks both gates 76a and 76b and piston 61 is now freed to move. Extruder 24 is operated to recharge reservoir 58 of shooting pot 59, displacing piston 61 until it contacts an injection stop Sa, shown in FIG. 1. The positioning of stop Sa controls and measures the amount of PET introduced into the reservoir 58.

In similar fashion, the injection stop Sb controls and measures the amount of EVOH introduced into the reservoir 68. During the course of packing the mold cavity, the reservoir 68 is recharged by opening spool valve 72 to allow the second extruder to displace piston 71 until the piston contacts its injection stop Sb, thus charging reservoir 68 with a measured amount of EVOH compound. After a suitable cooling interval, the mold is opened and the article is ejected by known means. The above cycle is can then be repeated, in continuous, automatic fashion, to generate additional layered articles.

It is also contemplated that articles comprising two or more layers of materials can be manufactured with the present invention, wherein one of the layers comprises a foamed material. For example, a first plastic material, such as a co-polymer of ethylene and vinyl acetate, can be injected into the mold to form the outer layer of the final article and a second plastic material, such as polyproylene, is then injected to form a foamed core. Another layer of the first plastic material can then be injected to seal the foam material between the layers of the first material, much like a sandwich. It is also contemplated that the simultaneous injection of two or more different materials can also be performed with the present invention. This allows, for example, the manufacture of articles of PET-PEN resin blends.

As will be apparent to those of skill in thee art the present invention need not be limited to nozzle and valve gate assemblies with only two gates and can instead include three or more gates, if desired. In another embodiment of the present invention, shown in FIGS. 4a, 4b and 4c , a nozzle assembly is shown wherein three separate gates feed three different plastic materials into one mold cavity. In this embodiment, the gates 200, 204 and 208, shown in FIG. 4a, can be different sizes or the same size (not shown) and each gate is separated from the other two by a protrusion 212, best seen in FIGS. 4b and 4c.

Figure 4A:
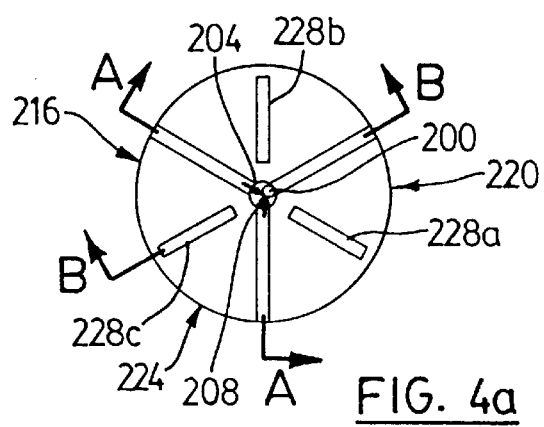
FIG. 4a is an end view of a nozzle assembly with three gates in accordance with the present invention.

FIG. 4a shows the pie-shaped arrangement of the three nozzle portions 216, 220 and 224 with insulating plates 228a, 228b and 228c, made of a suitable material as will occur to those of skill in the art. Plates 228 separate each nozzle portion 216, 200 and 224 to maintain different thermal profiles for each plastic material type being carried to each gate 200, 204 and 208, as dictated by the properties of particular materials.

Figure 4B:
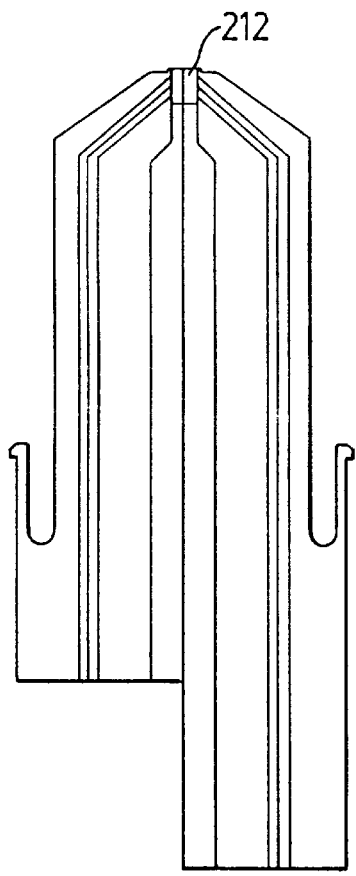
Figure 4C:
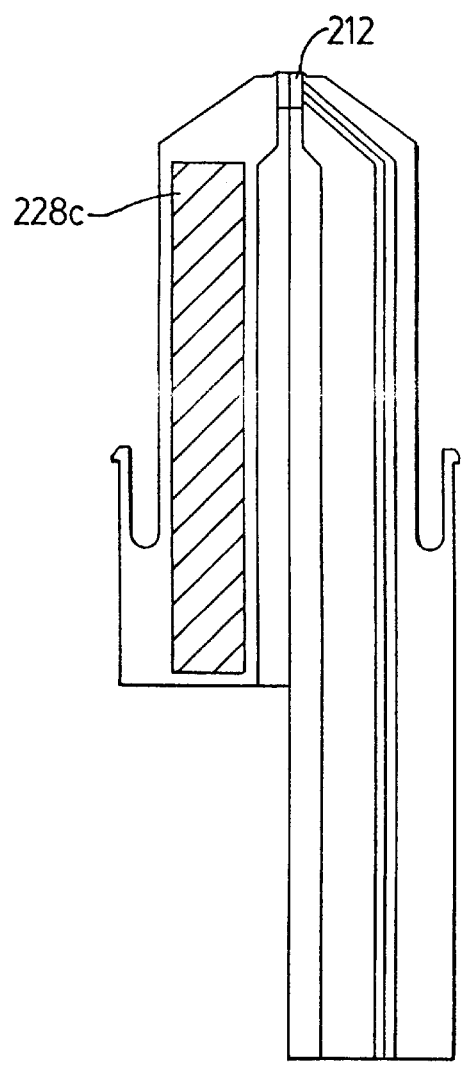
Figure 5B:
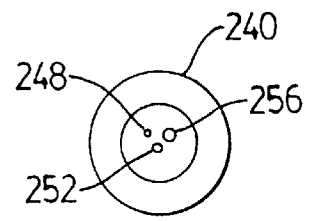
Figure 5A:
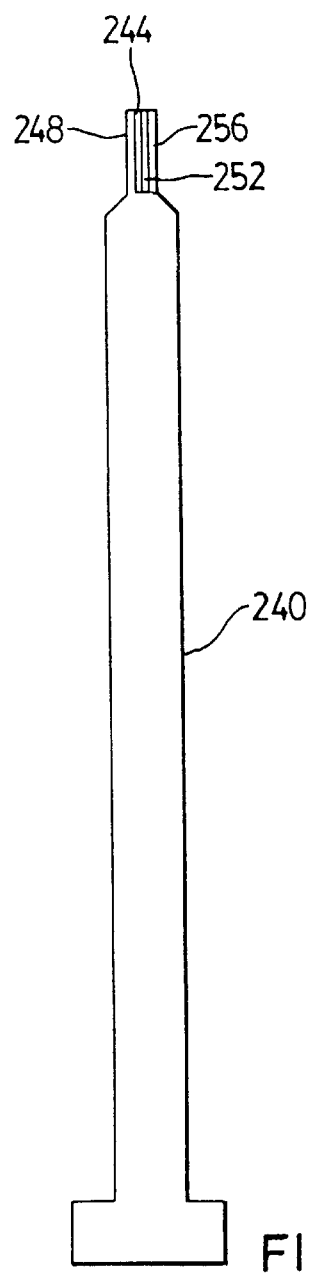

FIGS. 5a and 5b show a valve stem 240 for the nozzle assembly of FIGS. 4a, 4b and 4c and the slot 244 which engages protrusion 212, slot 244 being defined between pins 248, 252 and 256 which close respective ones of gates 200, 204 and 208 when stem 240 is advanced toward protrusion 212. While the discussion above has only described a single stem in the nozzle assembly, it is contemplated that in some circumstances more than one valve stem can be employed in the assembly, each valve stem being individually actuated and gating one or more gates.

It is contemplated that in some circumstances both valve gating and thermal gating can be employed in a single nozzle assembly in accordance with the present invention. For example, as illustrated in FIG. 4a wherein gate 204 is much smaller than gates 200 and 208, one or more gates can be much smaller, relative to the other gates, in the nozzle assembly and these smaller gates can be thermal gated in a conventional manner while larger gates, such as gates 200 and 208, can be valve gated.

It will be understood, of course, that modifications can be made to the embodiments of the invention illustrated and described herein without departing from the scope and purview of the invention as defined by the appended claims.

I claim:

1. A method of co-injecting at least two different plastic materials to form a multi-layer molded product using a hot runner injection molding machine with a separate channel for each material, each channel having an end in communication with an injection nozzle with a corresponding separate gate for feeding an injection mold and flow between said separate gates being prevented by a gate separating means, the method comprising for each of said at least two plastic materials (i) heating said plastic material in the respective separate channel;

(ii) moving a valve stem to a position wherein said corresponding gate for said plastic material is open;

(iii) inject a selected amount of said plastic material from said respective channel through said corresponding gate in said nozzle into the injection mold and preventing further flow of said plastic material from said corresponding gate;

(iv) moving said valve stem to close said corresponding gate.

2. The method as claimed in claim 1 further comprising the step of injecting a selected amount of a third material said third material being selected from one of said at least two plastic materials and any other plastic material, said third material being injected from its corresponding channel via its corresponding gate, said corresponding gate being separated from said second gate by said gate separating means.

3. The method as claimed in claim 2 wherein said third material is the same material as one of said at least two materials.

4. The method as claimed in claim 3 wherein a five layer, two material molded part is formed.

5. The method as claimed in claim 2 further comprising the steps of:

(a) injecting a first of said at least two plastic materials into the mold to form the outer layer of the final article; and (b) injecting a second of said at least two plastic materials which is foamed thermoplastic core material into the mold to form a foamed core article.

6. The method as claimed in claim 5 further comprising step (c) injecting the first plastic material into the mold to form a layer and seal off the foamed material at the gate and form the final article.

7. The method as claimed in claim 2 in which one of said at least two plastic materials and said third plastic material is a foamed material.

8. The method as claimed in claim 1 in which a first one of said at least two plastic materials is polyethylene teraphthalate (PET) and a second of said at least two plastic materials is EVOH.

9. The method of claim 1 wherein a common valve stem opens and closes at least two separate gates.

10. A method as claimed in claim 9 wherein said gate separating means comprises a protrusion to engage said common valve stem to inhibit lateral deflection of said common valve stem.

11. The method of claim 1 wherein each valve stem opening and closing a gate is independently operable from each other valve stem opening and closing a separate gate.

12. The method of claim 1 wherein step (iii) is performed simultaneously for each of said at least two plastic materials.

13. The method as claimed in claim 12 further comprising the step of, after step (iii), injecting a selected amount of a third material, said third material being selected from one of said at least two plastic materials and any other plastic material, said third material being injected from its respective channel via its corresponding gate.

14. A method as claimed in claim 1 wherein said corresponding gate for a first one of said at least two plastic materials is a different size than said corresponding gate.

15. A method as claimed in claim 1 further comprising at least first, second and third separate gates, at least said third separate gate being thermally gated.

16. A method according to claim 15 wherein at least one of said separate gates that are thermally gated is smaller than at least one separate corresponding gate closed by a valve stem.

\* \* \* \* \*